United States Patent
Gandhi et al.

(10) Patent No.: US 10,405,309 B2
(45) Date of Patent: Sep. 3, 2019

(54) SYSTEM AND METHOD OF DISTINCT DUTY CYCLE SUPPORT FOR DISTINCT MULTI-NETWORK PROTOCOL NETWORKS FOR INDUSTRIAL WIRELESS SENSOR NETWORKS

(71) Applicant: Honeywell International, Inc., Morris Plains, NJ (US)

(72) Inventors: Amol Gandhi, Bangalore (IN); Prasad Samudrala, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/437,408

(22) Filed: Feb. 20, 2017

(65) Prior Publication Data
US 2018/0242312 A1 Aug. 23, 2018

(51) Int. Cl.
| H04W 72/04 | (2009.01) |
| H04L 29/06 | (2006.01) |
| H04W 4/38 | (2018.01) |
| H04W 84/18 | (2009.01) |
| H04L 29/08 | (2006.01) |

(52) U.S. Cl.
CPC ......... *H04W 72/0446* (2013.01); *H04L 69/18* (2013.01); *H04W 4/38* (2018.02); *H04L 67/12* (2013.01); *H04W 84/18* (2013.01)

(58) Field of Classification Search
CPC .......................... H04W 72/0446; H04W 72/12
See application file for complete search history.

(56) References Cited

U.S. PATENT DOCUMENTS

| 5,732,076 A | 3/1998 | Ketseoglou et al. |
| 6,711,177 B1 | 3/2004 | Young |
| 7,327,717 B2 | 2/2008 | Borowski et al. |
| 7,782,831 B1 * | 8/2010 | Feeney ............... H04B 7/2656 370/321 |
| 7,965,664 B2 | 6/2011 | Hodson et al. |
| 7,969,300 B2 | 6/2011 | Coronel et al. |
| 8,239,046 B2 | 8/2012 | Koehler et al. |
| 8,583,067 B2 | 11/2013 | Budampati et al. |
| 9,021,255 B1 | 4/2015 | Aharoni et al. |

(Continued)

OTHER PUBLICATIONS

European Examination Report in connection with European Patent Application No. 14164273.6 dated Oct. 11, 2016, 5 pages.

(Continued)

*Primary Examiner* — Redentor Pasia

(57) ABSTRACT

An apparatus includes a memory element and processing device. The processing device is configured to receive an identification of a first field device supporting a first protocol and a second field device supporting a second protocol. The first field device uses a first publish period that is different from a second publish period of the second field device. The processing device is also configured to configure a superframe for each of the first and second field devices based on the identification of the field devices and supported protocols. Each of the configured superframes includes a plurality of time slots supporting each of the first and second publish periods. The processing device is also configured to assign a first set of time slots of the plurality of time slots to the first field device and a second set of time slots of the plurality of time to the second field device.

20 Claims, 9 Drawing Sheets

(56) References Cited

U.S. PATENT DOCUMENTS

| | | | |
|---|---|---|---|
| 9,379,972 | B2 | 6/2016 | Enns et al. |
| 9,544,081 | B2 | 1/2017 | Samudrala et al. |
| 9,661,079 | B2 | 5/2017 | Pulini et al. |
| 2001/0030975 | A1 | 10/2001 | Limb et al. |
| 2002/0105970 | A1 | 8/2002 | Shvodian |
| 2003/0169711 | A1 | 9/2003 | Borowski et al. |
| 2004/0259533 | A1 | 12/2004 | Nixon et al. |
| 2005/0005304 | A1 | 1/2005 | Kaul et al. |
| 2005/0174964 | A1 | 8/2005 | Orlik et al. |
| 2006/0087423 | A1 | 4/2006 | Coronel et al. |
| 2007/0280144 | A1 | 12/2007 | Hodson et al. |
| 2007/0286130 | A1* | 12/2007 | Shao ............... H04N 21/43637 370/336 |
| 2008/0080395 | A1 | 4/2008 | Law et al. |
| 2008/0089311 | A1* | 4/2008 | Roy .................... H04B 7/2612 370/345 |
| 2008/0198774 | A1 | 8/2008 | Li |
| 2009/0224906 | A1 | 9/2009 | Balgard et al. |
| 2009/0316628 | A1* | 12/2009 | Enns ................ H04L 12/40006 370/328 |
| 2010/0075611 | A1 | 3/2010 | Budampati et al. |
| 2011/0110291 | A1* | 5/2011 | Ishii ..................... H04B 7/155 370/315 |
| 2011/0245932 | A1 | 10/2011 | Schleiss et al. |
| 2011/0276607 | A1 | 11/2011 | Suma et al. |
| 2012/0063330 | A1 | 3/2012 | Mori et al. |
| 2012/0084400 | A1 | 4/2012 | Almadi et al. |
| 2012/0127971 | A1 | 5/2012 | Isaksson |
| 2012/0230446 | A1 | 9/2012 | Feng |
| 2012/0236768 | A1 | 9/2012 | Kolavennu et al. |
| 2013/0110998 | A1 | 5/2013 | Zrelli et al. |
| 2013/0142180 | A1 | 6/2013 | Gidlund et al. |
| 2014/0119220 | A1 | 5/2014 | Wang |
| 2014/0232555 | A1 | 8/2014 | Aakvaag et al. |
| 2014/0321443 | A1* | 10/2014 | Samudrala ............ H04J 3/1694 370/337 |
| 2014/0355581 | A1 | 12/2014 | Pulini et al. |
| 2015/0058480 | A1 | 2/2015 | Allgaier et al. |
| 2015/0281052 | A1 | 10/2015 | Enns et al. |
| 2015/0304193 | A1 | 10/2015 | Ishii et al. |
| 2016/0044661 | A1* | 2/2016 | Suresh ................ H04B 7/2656 370/337 |

OTHER PUBLICATIONS

Nokia, 9100 Multi-Standard Base Station, retrieved from https://networks.nokia.com/products/9100-multi-standard-base-station on Aug. 29, 2016, 1 page.

International Search Report in connection with International Application No. PCT/US2014/038208 dated Oct. 10, 2014, 3 pages.

Written Opinion of the International Searching Authority in connection with International Application No. PCT/US2014/038208 dated Oct. 10, 2014, 5 pages.

Communication pursuant to Article 94(3) EPC in connection with European Patent Application No. 14164273.6 dated October 10, 2014, 5 pages.

Definition of "ISA100.11a", Wikipedia, Oct. 2011, 2 pages.

Definition of "Wireless HART", Wikipedia, Feb. 2013, 2 pages.

Definition of "Time Division Multiple Access", Wikipedia, May 2013, 4 pages.

Supplementary European Search Report and Annex to the European Search Report in connection with European Patent Application No. 14807495.8 dated Nov. 17, 2016, 10 pages.

Office Action dated Jul. 14, 2016 in connection with U.S. Appl. No. 14/035,557, 14 pages.

European Search Report in connection with European Patent Application No. 14164273.6 dated Sep. 22, 2014, 3 pages.

International Search Report and Written Opinion of the International Searching Authority for International Patent Application No. PCT/US2018/018354 dated May 23, 2018, 11 pages.

\* cited by examiner

FIG. 3

SYSTEM AND METHOD OF DISTINCT DUTY CYCLE SUPPORT FOR DISTINCT MULTI-NETWORK PROTOCOL NETWORKS FOR INDUSTRIAL WIRELESS SENSOR NETWORKS

TECHNICAL FIELD

This disclosure relates generally to wireless communications in industrial systems. More specifically, this disclosure relates to a system and method of distinct duty cycle support for distinct multi-network protocol networks for industrial wireless sensor networks.

BACKGROUND

Process plants are often managed using industrial process control and automation systems. Conventional control and automation systems routinely include a variety of networked devices, such as servers, workstations, switches, routers, firewalls, safety systems, proprietary real-time controllers, and industrial field devices. Often times, there is a need to have multiple devices using separate protocols communicating in the systems. Due to the cost and complexity, constraints on the number of routers to accommodate may result in the number of possible devices to be limited.

SUMMARY

A first embodiment of this disclosure provides an apparatus for managing communications with field devices of different wireless standards in a single industrial wireless network. The apparatus includes a memory element configured to store a plurality of superframes for different publish periods supported by different field protocol devices. The apparatus also includes a processing device configured to receive an identification of a first field device supporting a first protocol and a second field device supporting a second protocol in an industrial control and automation system. The first field device uses a first publish period that is different from a second publish period of the second field device. The processing device is also configured to configure a superframe for each of the first and second field devices based on the identification of the field devices and supported protocols. Each of the configured superframes includes a plurality of time slots supporting each of the first and second publish periods. The processing device is also configured to assign a first set of time slots of the plurality of time slots to the first field device and a second set of time slots of the plurality of time to the second field device.

A second embodiment of this disclosure provides a method for managing communications in an industrial process control and automation system. The method includes receiving an identification of a first field device supporting a first protocol and a second field device supporting a second protocol in an industrial control and automation system. The first field device uses a first publish period that is different from a second publish period of the second field device. The method also includes configuring a superframe for each of the first and second field devices based on the identification of the field devices and supported protocols. Each of the configured superframes includes a plurality of time slots supporting each of the first and second publish periods. The method also includes assigning a first set of time slots of the plurality of time slots to the first field device and a second set of time slots of the plurality of time to the second field device.

A third embodiment of this disclosure provides a non-transitory computer readable medium containing computer readable program code that, when executed, causes at least one processing device to receive an identification of a first field device supporting a first protocol and a second field device supporting a second protocol in an industrial control and automation system, wherein the first field device uses a first publish period that is different from a second publish period of the second field device. The computer readable program code, when executed, also causes the at least one processing device to configure a superframe for each of the first and second field devices based on the identification of the field devices and supported protocols, wherein each of the configured superframes includes a plurality of time slots supporting each of the first and second publish periods. The computer readable program code, when executed, also causes the at least one processing device to assign a first set of time slots of the plurality of time slots to the first field device and a second set of time slots of the plurality of time to the second field device.

Other technical features may be readily apparent to one skilled in the art from the following figures, descriptions, and claims. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases may be provided throughout this patent document, and those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure, reference is now made to the following description, taken in conjunction with the accompanying drawings, in which:

FIG. 3 illustrates an ISA100 protocol time division multiple access (TDMA) table according to this disclosure;

DETAILED DESCRIPTION

FIGS. 1 to 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
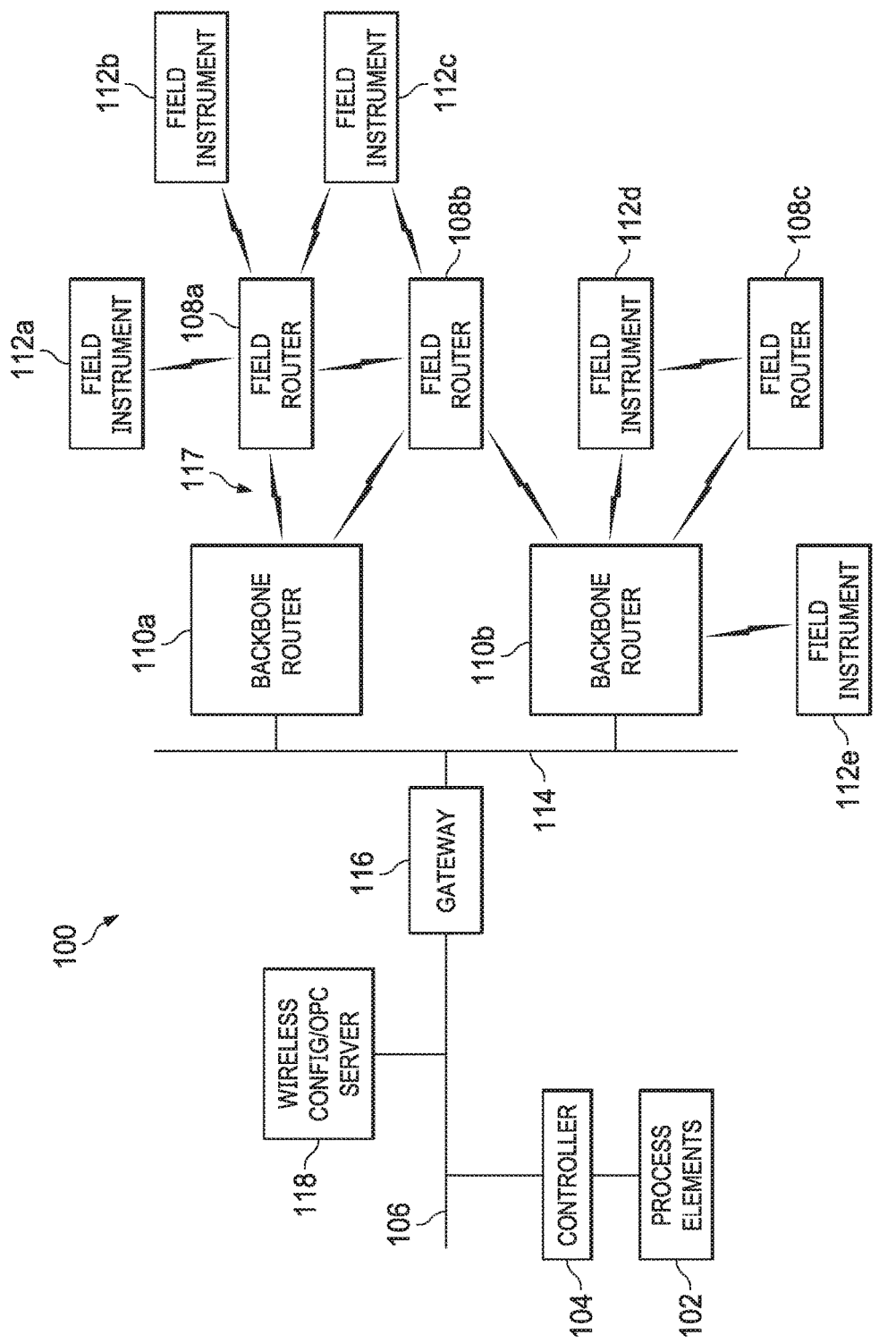
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks 117 for communicating with wireless sensors or other wireless field devices. In the example shown in FIG. 1, an industrial wireless network 117 includes field routers 108a-108c and backbone routers 110a-110b. The field routers 108a-108c and backbone routers 110a-110b wirelessly communicate with each other to form a wireless network 117, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network 117 can support any suitable industrial wireless network protocol(s), such as ISA100.11a, Highway Addressable Remote Transducer (HART), wireless HART (W-HART), WIA-PA or other field instrument protocol. The field instrument could communicate using one or more of these protocols.

In this example, the field routers 108a-108c and backbone routers 110a-110b generally represent routing devices that store and forward messages for other devices and that are typically line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and field instruments 112a-112e. The server 118 could also support security in the system 100, such as by distributing cryptographic keys or other security data to various wireless devices or other components. The server 118 includes any suitable structure for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

Figure 2:
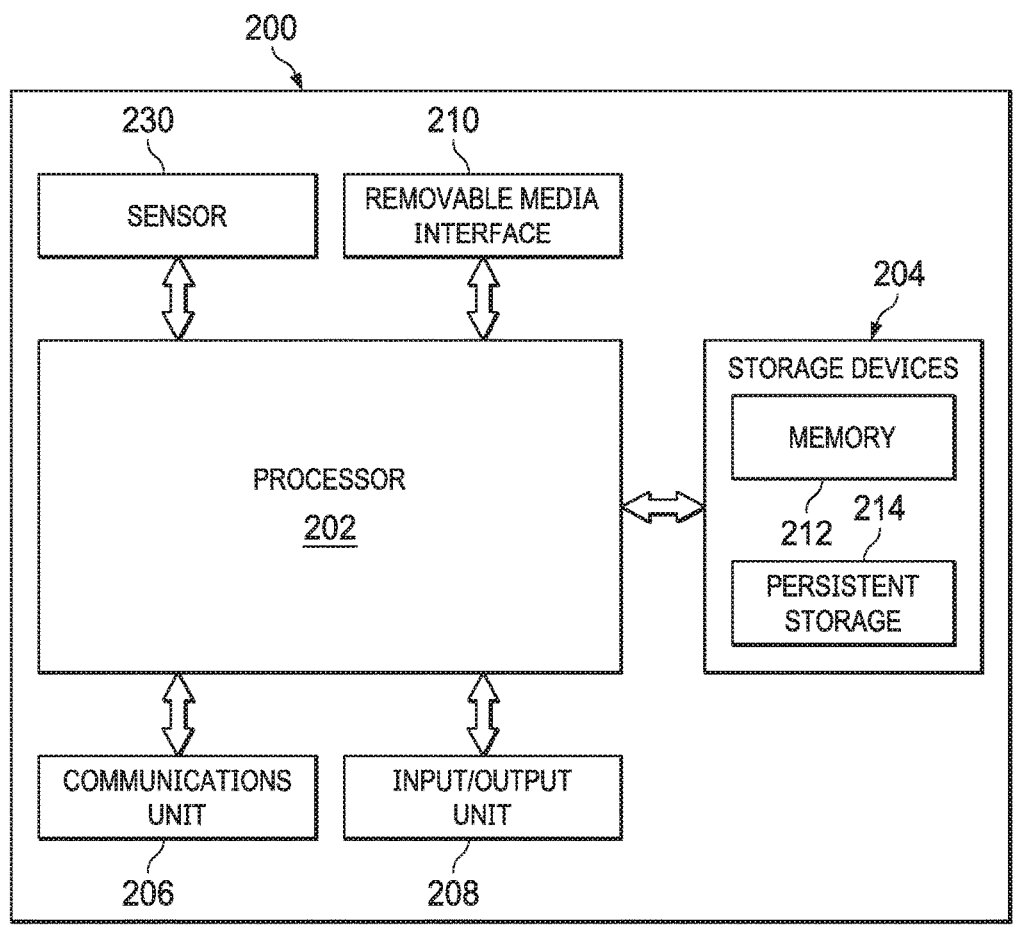
FIG. 2 illustrates an example device according to this disclosure.

FIG. 2 illustrates an example device 200 according to this disclosure. For example, the device 200 shown in FIG. 2 could denote any of the routers 108 and 110, gateway 116, server 118, field instruments 112, or controller 104 described above with respect to the system 100 of FIG. 1. However, the device 200 could be used in any other suitable system.

As shown in FIG. 2, the device 200 includes at least one processor 202, at least one storage device 204, at least one communications unit 206, at least one input/output (I/O) unit 308, and at least one removable media interface 210. Each processor 202 can execute instructions, such as those that may be loaded into a memory 212. Each processor 202 denotes any suitable processing device, such as one or more microprocessors, microcontrollers, digital signal processors, application specific integrated circuits (ASICs), field programmable gate arrays (FPGAs), or discrete circuitry.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network (such as the networks 106, 114, and 117). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable media interface 210 denotes a structure to which a storage device can be coupled. For example, the device 200 could include one or more USB slots, Secure Digital High Capacity (SDHC) or other Flash memory slots, or other interfaces for coupling to storage devices. Depending on the implementation, the device 200 could include a single removable media interface 210 or multiple removable media interfaces 210 of the same type or of different types.

In one or more example embodiments, the device 200 could also include a sensor 230. For example, the sensor 230 could measure a wide variety of characteristics in the process system, such as temperature, pressure, or flow rate of a material in a container or pipe.

When the device 200 implements a multi-protocol wireless network, the processor(s) 202 can execute instructions to communicate with field instruments from two different network protocols. For example, when receiving communication requests from multiple field instruments from different network protocols, the processor(s) 202 could execute instructions for scheduling the field instruments in a time division multiple access (TDMA) superframe.

Although FIG. 2 illustrates one example of a device 200 supporting secure data transfer using removable media, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

One or more embodiments of this disclosure recognize and take into account that a single wireless network supporting multiple different types of protocols needs to handle each protocol's characteristics if the protocols are distinct. The embodiments of this disclosure provide a solution that can be referred to as One Wireless, where OneWireless is a universal wireless system supporting two industrial protocols (ISA100.11a and WirelessHART). The protocols can vary at every layer except the physical and MAC layers.

In a TDMA system, each device uses the whole channel bandwidth for a fraction of time. Those fractions of time are called slots; a slot is the period of time in which the process data are transmitted. In each slot, only one station transmits to one or more destinations, in order to avoid collisions. Several slots make up a frame (which may also be called a superframe). The synchronization and address information are carried in the preamble and the guard times at the end of the slots, to avoid crosstalk among the transmissions. TDMA is a deterministic system once each device has its specific determined slot time in which to transmit.

One distinction between WirelessHART and ISA100 is process data publish periods. Both WirelessHART and ISA100.11a implement time diversity through TDMA.

One or more embodiments of this disclosure recognize and take into account that WirelessHART uses supported publish periods defined as $2^n$, where n is a positive or a negative integer. For example, a publish period can be 250 ms, 500 ms, 1 s, 2 s, 4 s, 8 s, 16 s, 32 s, 60 s, or more.

In contrast, ISA100.11a divides time in short timeslots, with each timeslot typically 10 ms long. The maximum transmission time of a packet can take approximately 4 ms which results in a 0.004% duty cycle when data is being transmitted once a second. A 10 ms time slot can be common for both ISA100 and WirelessHART. In one example, WirelessHART may only support a $2^n$ publishes period while ISA100 may only support multiples of $\frac{1}{4}^{th}$ second publish periods.

Therefore wireless transmissions take place in bursts with transmission occurring at clearly pre-determined times, increasing the robustness to interference. The ISA100.11a protocol supports any publish period in multiples of ¼-second or 1-second. Examples include 250 ms, 500 ms, 1-second, 2-second, 4-second, 8-second, etc.; or 1-second, 2-second, 3-second, 4-second, 5-second, 10-second, etc.

It is important that the router identifies the type of device and manages the publish periods accordingly to configure the scheduling of the field devices. The wireless network 117 provided herein includes OneWireless Network Manager that can implement two separate TDMA allocation tables for WirelessHART and ISA100 devices. For ISA100 devices, the system implements 5-sec and 10-sec TDMA tables. Any slot allocated to ISA100 devices is in multiple of 5-sec (5-sec, 10-sec, 30-sec, 60-sec etc.). All ISA100 superframes are of the same configured device publish period. For WirelessHART devices, the system implements 4-sec and 8-sec TDMA tables. Any slot allocated to WirelessHART devices is in multiple of 4-sec (4-sec, 8-sec, 16-sec, 32-sec etc.). All WirelessHART superframes are of the same configured device publish period.

Figure 3:
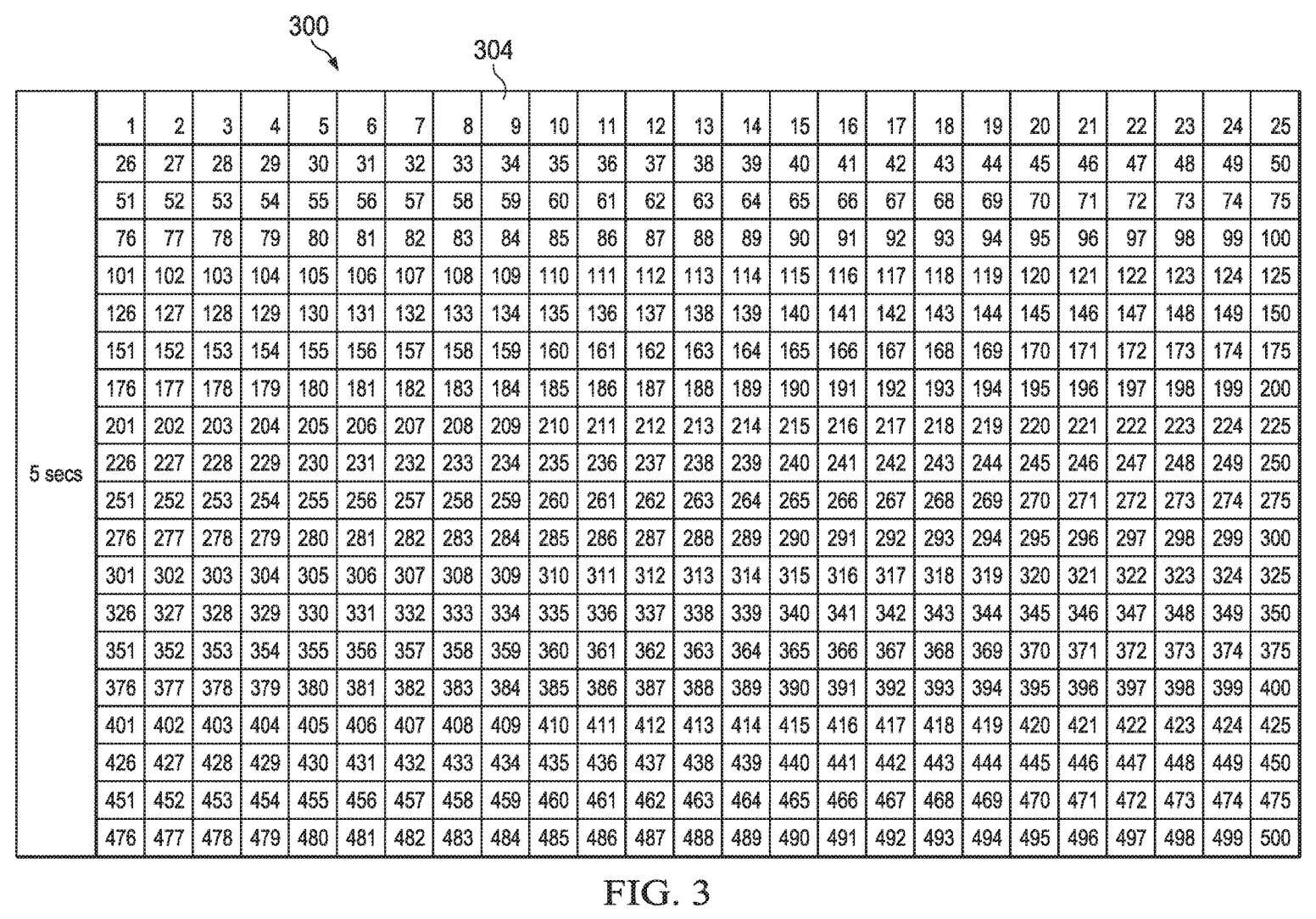

FIG. 3 illustrates an ISA100 TDMA table 300 according to this disclosure. The embodiment of the table 300 shown in FIG. 3 is for illustration only. Other embodiments could be used without departing from the scope of the present disclosure.

In FIG. 3, the TDMA table 300 is the length of one TDMA superframe. A TDMA table 300 contains time slots 304, where each radio of a device can transmit in one or more time slots. As illustrated herein, time slot 304 is the ninth time slot of the superframe as shown in table 300. The slots are sequentially numbered. For example, in table 300, the TDMA superframe includes 500 slots. FIG. 3 illustrates an example of a 5-second table. In other example embodiments, 10-second tables could be used which include 1000 slots numbered from 1 to 1000.

Figure 4A:
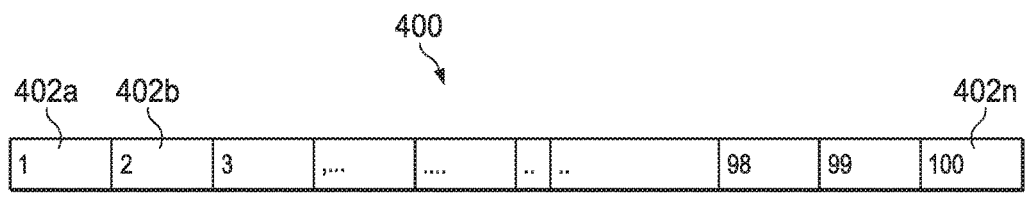
FIGS. 4A-4C illustrate ISA100 superframes according to this disclosure.
Figure 4B:
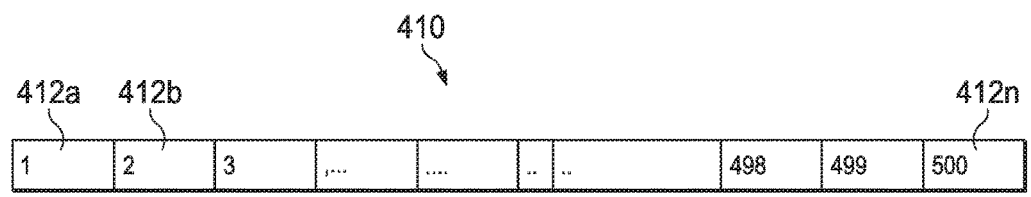
Figure 4C:
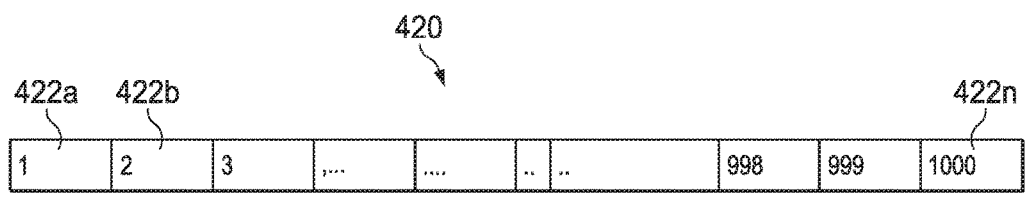

FIGS. 4A-C illustrate ISA100 superframes 400, 410, and 420 according to this disclosure. The embodiments of the superframes 400, 410, and 420 shown in FIGS. 4A-C are for illustration only. Other embodiments could be used without departing from the scope of the present disclosure.

FIG. 4A illustrates superframe 400 corresponding to a 1-second publish period. For a 1-second publish period, slots 402a-402n are allocated only from 1 to 100 in the TDMA table of superframe 400. In one example embodiment, the recursive slots 101, 201, 301, 401, etc., present in bigger super frames such as 5-sec and 1-sec extra are not used if slot 1 is allocated for 1-second publish period for any device. Since Slot 1 in 1-sec super frame repeats at 101, 201, 301 etc. in 5-sec and higher super frames so those slots cannot be used and treated as allocated.

FIG. 4B illustrates superframe 410 corresponding to a 5-second publish period. For a 5-second publish period, slots 412a-412n are allocated only from 1 to 500 in the 5-second TDMA table of superframe 410.

FIG. 4C illustrates superframe 420 corresponding to a 10-second publish period. For a 10-second publish period, slots 422a-422n are allocated only from 1 to 1000 in the 10-second TDMA table of superframe 420.

Figure 5:
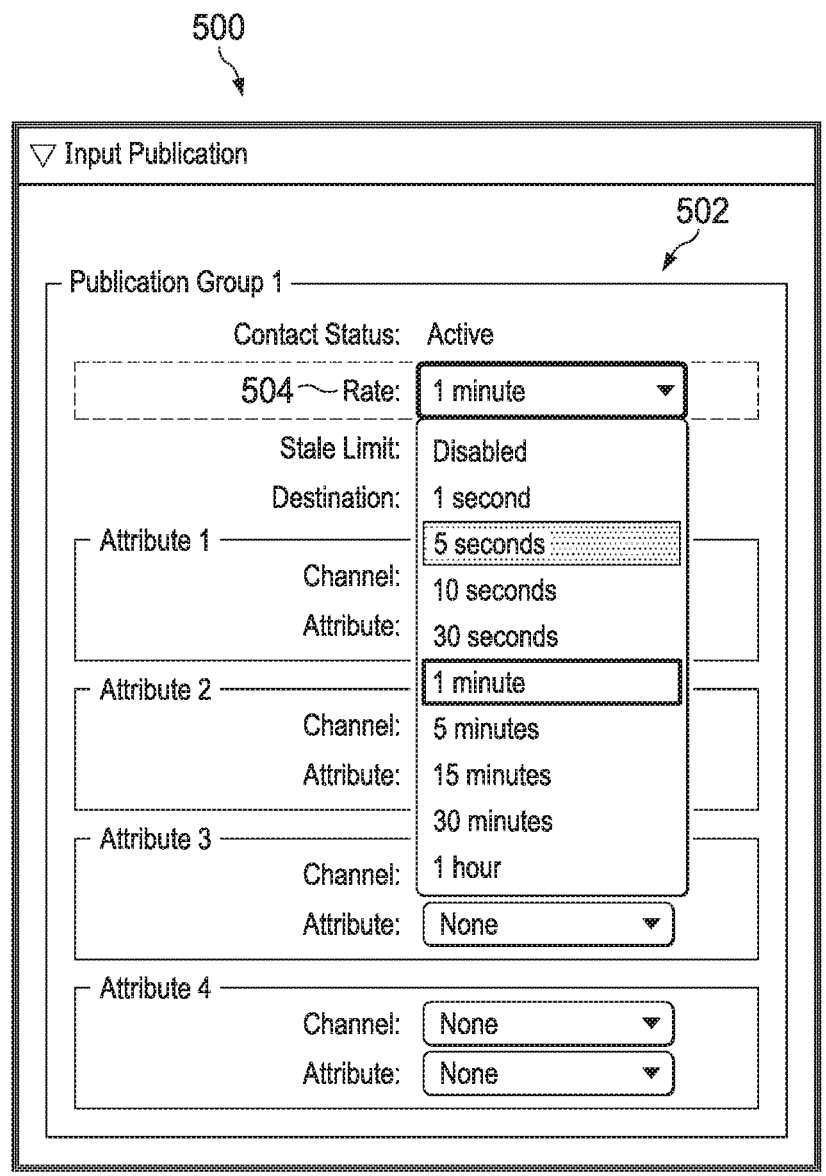
FIG. 5 illustrates a user interface for ISA100 publish configuration according to this disclosure.

FIG. 5 illustrates a user interface (UI) 500 for ISA100 publish configuration according to this disclosure. The embodiment of the UI 500 shown in FIG. 5 is for illustration only. Other embodiments could be used without departing from the scope of the present disclosure. The UI 500 can correspond to a specific field instrument of system 100 as shown in FIG. 1. A field instrument can also be referred to as a field device.

In FIG. 5, the UI 500 displays and receives information associated with a publication group configuration 502. The configuration 502 includes a rate 504. Rate 504 can be a publish period for the field device. The rate 504 indicates the frequency with which the field device transmits periodic data to the gateway via Routers. This rate 504 can be sent to one or more of the routers 108a-108c and Field Instruments 112a-112e.

Figure 6:
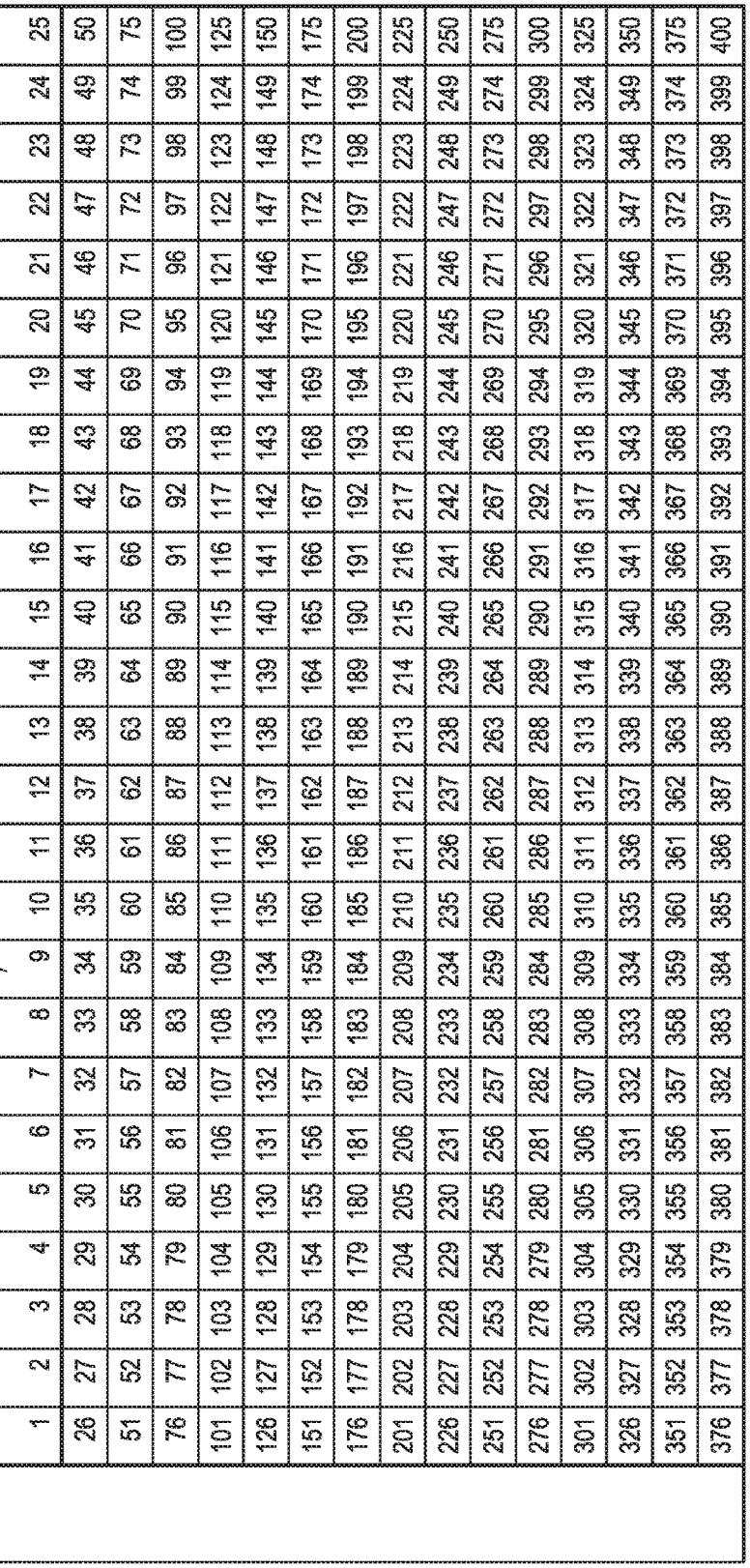
FIG. 6 illustrates a WirelessHART protocol TDMA table according to this disclosure.

FIG. 6 illustrates a WirelessHART TDMA table 600 according to this disclosure. The embodiment of the table 600 shown in FIG. 6 is for illustration only. Other embodiments could be used without departing from the scope of the present disclosure.

In FIG. 6, the TDMA table 600 is the length of one TDMA superframe. A TDMA table 600 contains time slots 604, where each radio of a device can transmit in one or more time slots. As illustrated herein, the time slot 604 is the ninth time slot of the superframe as shown in table 600. The slots are sequentially numbered. For example, in the table 600, the TDMA superframe includes 400 slots. FIG. 6 illustrates an example of a 4-second table. In other example embodiments, 8-second tables could be used which include 800 slots numbered from 1 to 800.

Figure 7A:
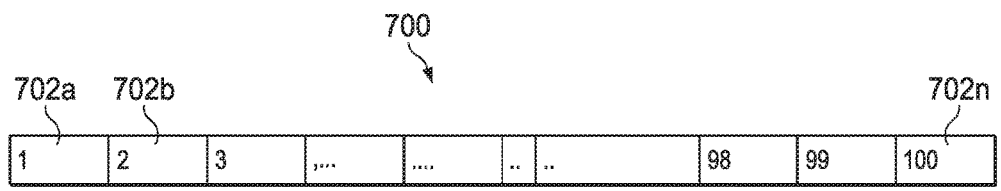
FIGS. 7A-7C illustrate WirelessHART superframes according to this disclosure.
Figure 7B:
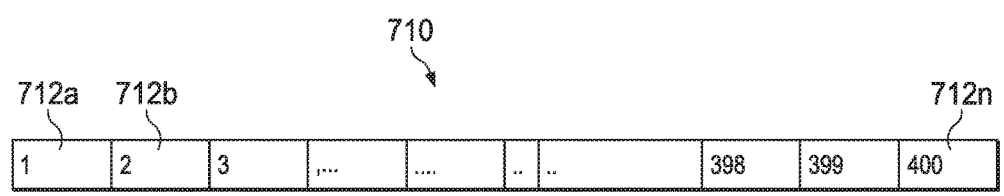
Figure 7C:
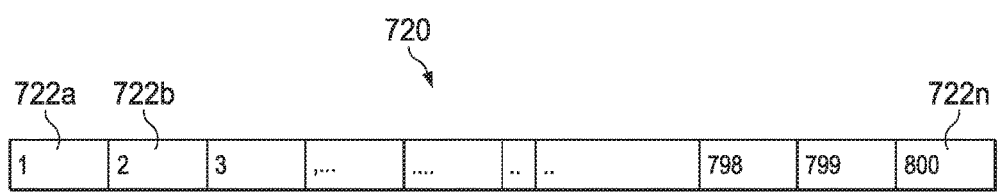

FIGS. 7A-C illustrate WirelessHART superframes 700, 710, and 720 according to this disclosure. The embodiments of the superframes 700, 710, and 720 shown in FIGS. 7A-C are for illustration only. Other embodiments could be used without departing from the scope of the present disclosure.

FIG. 7A illustrates superframe 700 corresponding to a 1-second publish period. For a 1-second publish period, slots 702a-702n are allocated only between 1 to 100 in the TDMA table of superframe 700. In one example embodiment, the recursive slots 101, 201, 301, 401, etc., are not used if slot 1 is allocated for 1-second publish period for any device.

FIG. 7B illustrates superframe 710 corresponding to a 4-second publish period. For a 4-second publish period, slots 712a-712n are allocated only between 1 to 400 in the 4-second TDMA table of superframe 710.

FIG. 7C illustrates superframe 720 corresponding to an 8-second publish period. For an 8-second publish period, slots 722a-722n are allocated only between 1 to 800 in the 8-second TDMA table of superframe 720.

Figure 8:
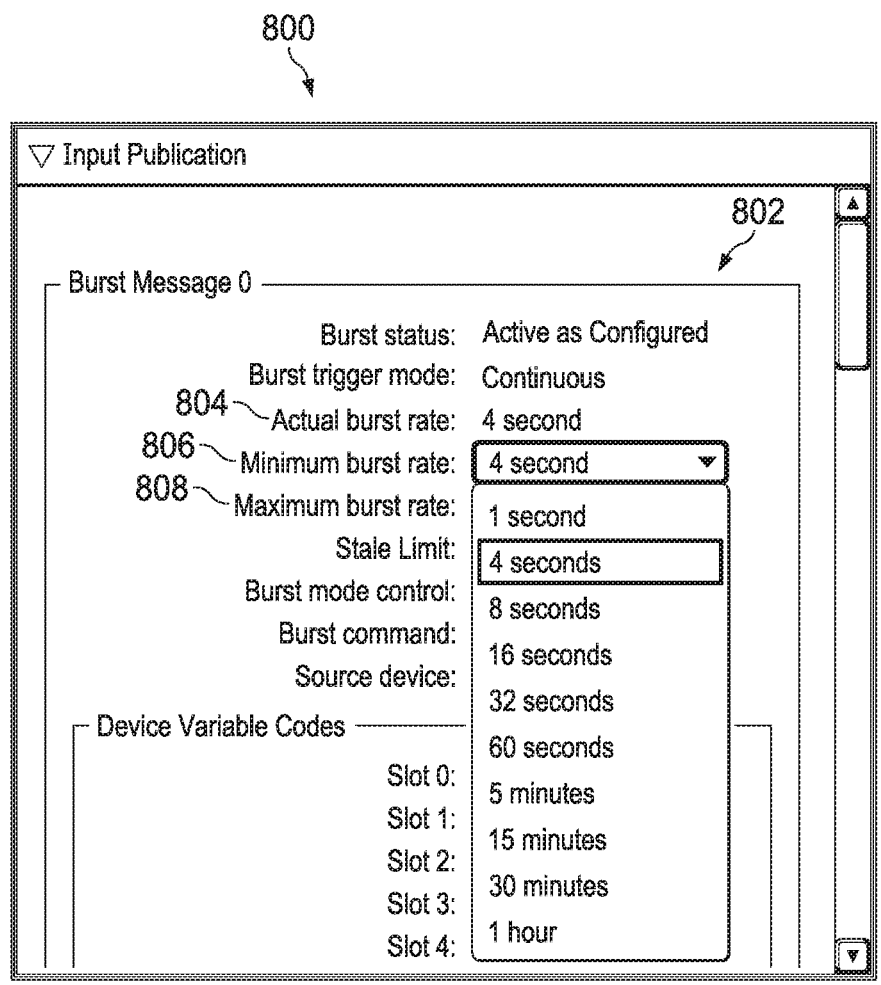
FIG. 8 illustrates a user interface for WirelessHART publish configuration according to this disclosure.

FIG. 8 illustrates a UI 800 for WirelessHART publish configuration according to this disclosure. The embodiment of the UI 800 shown in FIG. 8 is for illustration only. Other embodiments could be used without departing from the scope of the present disclosure. The UI 800 can correspond to a specific field device of system 100 as shown in FIG. 1.

In FIG. 8, the UI 800 displays and receives information associated with a publish configuration 802. The configuration 802 includes an actual burst rate 804, minimum burst rate 806, and maximum burst rate 808. Burst Rates 804-808 are the publish periods for the WirelessHART field devices. The rates 804-808 indicate the frequency with which the field device transmits to the router. This rates 804-808 can be sent to one or more of the routers 108a-108c and Field Instruments 112a-112e.

Figure 9:
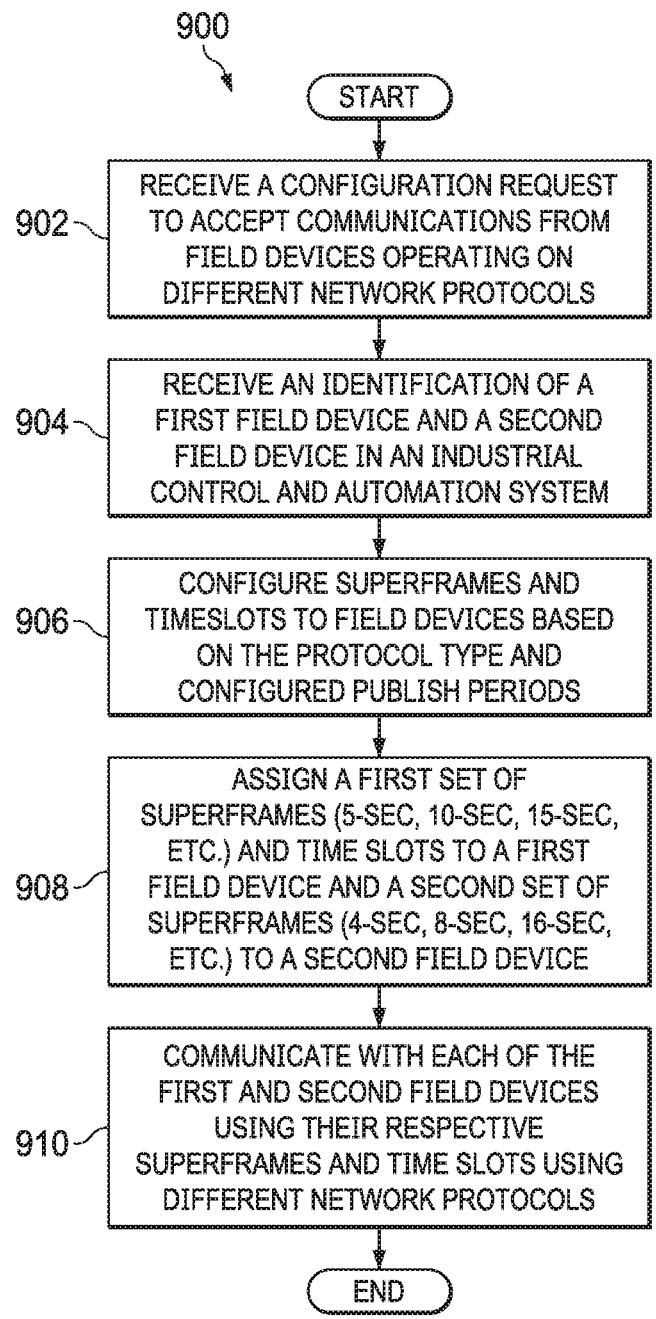
FIG. 9 illustrates an example process for managing communications of field devices in a network according to this disclosure.

FIG. 9 illustrates an example process 900 for managing communications of field devices in a network according to this disclosure. A processing device, such as a controller, processor, or processing circuitry, can implement different operations in FIG. 9. The process 900 can be implemented in different devices shown in the system 100 of FIG. 1. For example the process 900 can be implemented by one of routers 108a-108c and 110a-110b, gateway 116, server 118, or a combination thereof.

At operation 902, the router receives a configuration request to accept communications from field devices operating on different network protocols (e.g., ISA100, WirelessHART, etc.). The request may be received from one of routers 108a-108c and 110a-110b, gateway 116, and server 118. The request can be a configuration command to switch to a multi-protocol mode enabling simultaneous communications with devices of different network protocols using different super frames. As discussed herein, simultaneous can be defined as communication with different type of devices using different type of super frames using assigned time slots in their super frames.

At operation 904, the router receives an identification of a first field device and a second field device in an industrial control and automation system. The first field device uses a first publish period that is different from a second publish period of the second field device. The identification can include a device type, network protocol used by the device, publish period (rate) information, and the like. The two field devices could include different publish periods. For example the first field device could use a 4-second publish period, while the second field device could use a 5-second publish period.

At operation 906, the router configures superframes and timeslots to field devices based on the protocol type and configured publish period. This configuration can include a hybrid schedule supporting both the first and second publish periods. The hybrid schedule is in a time division multiple access (TDMA) format and includes a plurality of time slots. A wireless configurator application executed by the router or server can maintain a hybrid TDMA table (combination of two different TDMA tables for two different protocols) for each router (e.g., 5-second superframe vs 4-second superframe). The configurator allocates one slot for only one device irrespective of the device type. For example, if slot 1 is allocated for ISA100 device in 5-second superframe, then slot 1 in the 4-second WirelessHART TDMA table cannot be used and is marked as occupied because router (through the use of a transceiver) may only talk to one device at a time during one time slot.

The wireless configurator application being executed by the router can generate a hybrid table in the memory of the router to manage two TDMA tables of different field devices for each router to allocate unique slots for different devices joined under the router to avoid same slot allocating to more than one device and meeting the publish periods requested. This table also includes periodic superframes. If the router allocates slot 1 in a 1-sec superframe for an ISA100 device, the router cannot use 101, 201, 301, etc. slots in a TDMA table for any other device irrespective of any device type. If the router allocates slot 2 in a 4-sec superframe for a Wireless HART device then slot 102, 202 and 302 can be used in 4-sec or 5-sec super frame for another device, but 402 cannot be used in 5-sec super frame because 402 and slot 2 are same slots in a 4-sec superframe already allocated. This way a hybrid TDAM table is maintained based on allocated slots in each of the superframes. That is, the router or server can maintain a hybrid schedule of overlapping superframes to determine which slots are available in each superframe.

The hybrid TDMA table can be maintained by the configurator (e.g., in a server) for each router separately and can also be located at each router for its real communication with field instruments or peer routers.

At operation 908, the router assigns a first set of superframes (5-sec, 10-sec, 15-sec, etc.) and a first set of time slots to the first field device and a second set of superframes (4-sec, 8-sec, 16-sec, etc.) and a second set of time slots to the second field device. A first field device uses a publish period from a first configurable publish period set of time slots that is different from the second configurable publish period set of time slots used for second field device configuration.

At operation 910, the router communicates with each of the first and second field devices using different super frames and time slots using different network protocols.

Although FIG. 9 illustrates one example of a process 900 for accessing field device information in an industrial process control and automation system, various changes may be made to FIG. 9. For example, while FIG. 9 shows a series of steps, various steps could overlap, occur in parallel, occur in a different order, or occur any number of times. In addition, the process 900 could include any number of events, event information retrievals, and notifications.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a memory element configured to store a plurality of superframes for different publish periods supported by different field protocol devices; and
   at least one processing device configured to:
   receive an identification of a first field device supporting a first protocol and a second field device supporting a second protocol in an industrial control and automation system, wherein the first field device uses a first publish period that is different from a second publish period of the second field device;
   configure, by generating a hybrid time division multiple access (TDMA) table, a superframe for each of the first and second field devices based on the identification of the field devices and supported protocols, wherein each of the configured superframes includes a plurality of time slots supporting each of the first and second publish periods, wherein the hybrid TDMA table comprises a first TDMA table for the first field device and a different second TDMA table for the second field device that allocates unique slots for different field protocol devices; and assign, in the hybrid TDMA table, a first set of time slots of the plurality of time slots to the first field device and a second set of time slots of the plurality of time slots to the second field device, wherein the first set of time slots are marked occupied to prevent the second field device from using the first set of time slots.

2. The apparatus of claim 1, wherein the configuration of the superframes is in a TDMA format.

3. The apparatus of claim 1, wherein the at least one processing device is further configured to:

receive a configuration request to accept communications from field devices operating on different network protocols.

4. The apparatus of claim 1, wherein the first publish period is shorter than the second publish period.

5. The apparatus of claim 2, wherein each time slot of the plurality of time slots is allocated to a single device irrespective of device type.

6. The apparatus of claim 3, wherein the first field device operates on a different network protocol than the second field device.

7. The apparatus of claim 6, wherein the first field device operates according to a WirelessHART protocol and the second field device operates according to an ISA100.11a protocol.

8. A method comprising:

receiving an identification of a first field device supporting a first protocol and a second field device supporting a second protocol in an industrial control and automation system, wherein the first field device uses a first publish period that is different from a second publish period of the second field device;

configuring, by generating a hybrid time division multiple access (TDMA) table, a superframe for each of the first and second field devices based on the identification of the field devices and supported protocols, wherein each of the configured superframes includes a plurality of time slots supporting each of the first and second publish periods, wherein the hybrid TDMA table comprises a first TDMA table for the first field device and a different second TDMA table for the second field device that allocates unique slots for different field protocol devices; and assigning, in the hybrid TDMA table, a first set of time slots of the plurality of time slots to the first field device and a second set of time slots of the plurality of time slots to the second field device, wherein the first set of time slots are marked occupied to prevent the second field device from using the first set of time slots.

9. The method of claim 8, wherein the configuration of the superframes is in a TDMA format.

10. The method of claim 8, further comprising:

receiving a configuration request to accept communications from field devices operating on different network protocols.

11. The method of claim 8, wherein the first publish period is shorter than the second publish period.

12. The method of claim 9, wherein each time slot of the plurality of time slots is allocated to a single device irrespective of device type.

13. The method of claim 10, wherein the first field device operates on a different network protocol than the second field device.

14. The method of claim 13, wherein the first field device operates according to a WirelessHART protocol and the second field device operates according to an ISA100.11a protocol.

15. A non-transitory computer readable medium containing computer readable program code that, when executed, causes at least one processing device to:

receive an identification of a first field device supporting a first protocol and a second field device supporting a second protocol in an industrial control and automation system, wherein the first field device uses a first publish period that is different from a second publish period of the second field device;

configure, by generating a hybrid time division multiple access (TDMA) table, superframe for each of the first and second field devices based on the identification of the field devices and supported protocols, wherein each of the configured superframes includes a plurality of time slots supporting each of the first and second publish periods, wherein the hybrid TDMA table comprises a first TDMA table for the first field device and a different second TDMA table for the second field device that allocates unique slots for different field protocol devices; and assign, in the hybrid TDMA table, a first set of time slots of the plurality of time slots to the first field device and a second set of time slots of the plurality of time slots to the second field device, wherein the first set of time slots are marked occupied to prevent the second field device from using the first set of time slots.

16. The non-transitory computer readable medium of claim 15, wherein the configuration of the superframes is in a TDMA format.

17. The non-transitory computer readable medium of claim 15, further comprising program code that causes the at least one processing device to:

receive a configuration request to accept communications from field devices operating on different network protocols.

18. The non-transitory computer readable medium of claim 15, wherein the first publish period is shorter than the second publish period.

19. The non-transitory computer readable medium of claim 16, wherein each time slot of the plurality of time slots is allocated to a single device irrespective of device type.

20. The non-transitory computer readable medium of claim 17, wherein the first field device operates on a different network protocol than the second field device.

* * * * *